United States Patent
Farrand et al.

(10) Patent No.: US 9,651,846 B2
(45) Date of Patent: *May 16, 2017

(54) PARTICLES FOR ELECTROPHORETIC DISPLAYS

(71) Applicant: Merck Patent GmbH, Darmstadt (DE)

(72) Inventors: Louise Diane Farrand, Dorset (GB); Jonathan Henry Wilson, Southampton (GB); Simon Biggs, Wetherby (GB); Olivier Cayre, Thurlstone (GB); Simon Lawson, Harrogate (GB); Alexandre Richez, Newport (GB); Simone Stuart-Cole, Morpeth (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/400,672

(22) PCT Filed: May 7, 2013

(86) PCT No.: PCT/EP2013/001341
§ 371 (c)(1),
(2) Date: Nov. 12, 2014

(87) PCT Pub. No.: WO2013/170938
PCT Pub. Date: Nov. 21, 2013

(65) Prior Publication Data
US 2015/0123049 A1 May 7, 2015

(30) Foreign Application Priority Data
May 14, 2012 (EP) .................... 12003786

(51) Int. Cl.
| | |
|---|---|
| C09K 9/00 | (2006.01) |
| G02F 1/00 | (2006.01) |
| G02F 1/167 | (2006.01) |
| C09C 1/36 | (2006.01) |
| C08F 2/44 | (2006.01) |
| C08F 220/14 | (2006.01) |
| C08F 292/00 | (2006.01) |
| C09C 1/40 | (2006.01) |
| C09C 3/10 | (2006.01) |
| C09C 3/12 | (2006.01) |
| C09C 1/02 | (2006.01) |
| C09C 1/24 | (2006.01) |
| C09C 1/30 | (2006.01) |
| B01J 13/02 | (2006.01) |
| B05D 7/00 | (2006.01) |

(52) U.S. Cl.
CPC .............. *G02F 1/167* (2013.01); *C08F 2/44* (2013.01); *C08F 220/14* (2013.01); *C08F 292/00* (2013.01); *C09C 1/021* (2013.01); *C09C 1/24* (2013.01); *C09C 1/3072* (2013.01); *C09C 1/3081* (2013.01); *C09C 1/3676* (2013.01); *C09C 1/3684* (2013.01); *C09C 1/40* (2013.01); *C09C 3/10* (2013.01); *C09C 3/12* (2013.01); *C01P 2004/62* (2013.01); *C01P 2004/84* (2013.01); *C01P 2006/40* (2013.01); *G02F 2001/1678* (2013.01)

(58) Field of Classification Search
USPC .......... 252/500, 519.34, 583; 359/290, 296; 428/402; 524/555, 850, 853; 526/311, 526/312; 534/560, 561, 829; 204/450; 427/213.3
See application file for complete search history.

(56) References Cited

U.S. PATENT DOCUMENTS

| | | |
|---|---|---|
| 5,380,362 A | 1/1995 | Schubert |
| 5,403,518 A | 4/1995 | Schubert |
| 5,599,889 A * | 2/1997 | Stover ................ C08F 2/06 526/217 |
| 5,783,614 A | 7/1998 | Chen et al. |
| 5,932,633 A | 8/1999 | Chen et al. |
| 5,964,935 A | 10/1999 | Chen et al. |
| 6,117,368 A | 9/2000 | Hou |
| 6,194,488 B1 | 2/2001 | Chen et al. |
| 6,842,275 B2 * | 1/2005 | Kawai ................ 359/265 |
| 6,956,690 B2 | 10/2005 | Yu et al. |
| 7,038,655 B2 | 5/2006 | Herb et al. |
| 7,052,766 B2 | 5/2006 | Zang et al. |
| 7,110,162 B2 | 9/2006 | Wu et al. |
| 7,170,670 B2 | 1/2007 | Webber |
| 7,226,550 B2 | 6/2007 | Hou et al. |
| 7,236,290 B1 | 6/2007 | Zhang et al. |

(Continued)

FOREIGN PATENT DOCUMENTS

| | | | |
|---|---|---|---|
| GB | WO 2011/154103 | * | 12/2011 |
| JP | 2008122468 A | | 5/2008 |

(Continued)

OTHER PUBLICATIONS

Wilfred Smulders and Michael J. Monteiro, Seeded Emulsion Polymerization of Block Copolymer Core-Shell Nanoparticles with Controlled Particle Size and Molecular Weight Distribution Using Xanthate-Based RAFT Polymerization, Macromolecules 2004, 37, 4474-4483, © 2004 American Chemical Society.*
International Search Report for PCT/EP2013/001341 mailed Sep. 26, 2013.
International Search Report for PCT/EP2013/001338 mailed Oct. 4, 2013.

(Continued)

*Primary Examiner* — Bijan Ahvazi

(57) ABSTRACT

This invention relates to particles for electrophoretic displays, a process for their preparation, electrophoretic fluids comprising such particles, and electrophoretic display devices comprising such fluids.

15 Claims, 1 Drawing Sheet

(56) References Cited

U.S. PATENT DOCUMENTS

| | | |
|---|---|---|
| 7,247,379 B2 | 7/2007 | Pullen et al. |
| 7,277,218 B2 | 10/2007 | Hwang et al. |
| 7,880,955 B2 | 2/2011 | Naijo et al. |
| 2007/0128352 A1 | 6/2007 | Honeyman et al. |
| 2008/0291526 A1* | 11/2008 | Lin .................. G02F 1/167 |
| | | 359/296 |
| 2009/0201569 A1 | 8/2009 | Akashi et al. |
| 2009/0207476 A1* | 8/2009 | Yanagisawa et al. ........ 359/296 |
| 2010/0002287 A1 | 1/2010 | Naijo et al. |
| 2011/0079756 A1 | 4/2011 | Chun et al. |
| 2011/0175939 A1 | 7/2011 | Moriyama et al. |
| 2012/0112131 A1 | 5/2012 | Li et al. |
| 2015/0099119 A1 | 4/2015 | Farrand et al. |
| 2015/0126680 A1 | 5/2015 | Farrand et al. |
| 2015/0129819 A1 | 5/2015 | Farrand et al. |
| 2015/0168746 A1 | 6/2015 | Blackman et al. |

FOREIGN PATENT DOCUMENTS

| | | |
|---|---|---|
| JP | 2009031329 A | 2/2009 |
| WO | WO-99/10767 A1 | 3/1999 |
| WO | WO-02093246 A1 | 11/2002 |
| WO | WO-2004067593 A2 | 8/2004 |
| WO | WO-2005017046 A2 | 2/2005 |
| WO | WO-2005036129 A2 | 4/2005 |
| WO | WO-2009086079 A2 | 7/2009 |
| WO | WO-2009100803 A2 | 8/2009 |
| WO | WO-2010089058 A1 | 3/2010 |
| WO | WO-2010089057 A2 | 8/2010 |
| WO | WO-2010089059 A1 | 8/2010 |
| WO | WO-2010089060 A2 | 8/2010 |
| WO | WO-2010104606 A1 | 9/2010 |
| WO | WO-2010148061 A2 | 12/2010 |
| WO | WO-2011017446 A1 | 2/2011 |
| WO | WO-2011075720 A1 | 6/2011 |
| WO | WO-2011154103 A1 | 12/2011 |
| WO | WO-2012019704 A1 | 2/2012 |
| WO | WO-2012152392 A1 | 11/2012 |

OTHER PUBLICATIONS

International Search Report for PCT/EP2013/001335 mailed Sep. 25, 2013.

International Search Report for PCT/EP2013/001339 mailed Sep. 25, 2013.

International Search Report for PCT/EP2013/001336 mailed Sep. 2, 2013.

O'Neill, M., et al., "Dispersion Polymerization in Supercritical CO2 with Siloxane-Based Macromonomer. 2. The Particle Formation Regime", Macromolecules, 1998, vol. 31, pp. 2848-2856.

Shaffer, K., et al., "Dispersion Polymerization in Carbon Dioxide Using Siloxane-Based Stabilizers", 1996, vol. 29, pp. 2704-2706.

* cited by examiner

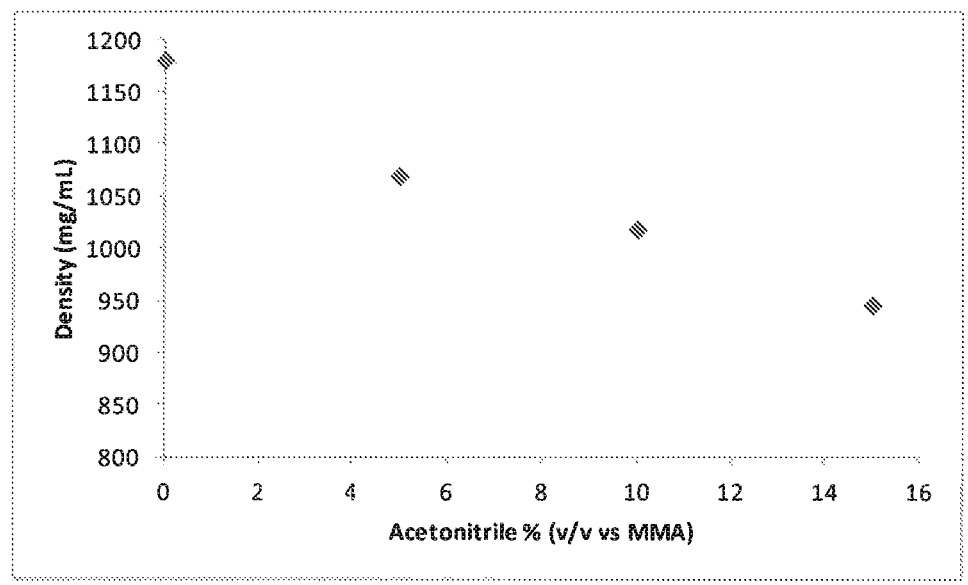

PARTICLES FOR ELECTROPHORETIC DISPLAYS

CROSS-REFERENCE TO RELATED APPLICATIONS

This application is a national stage application (under 35 U.S.C. §371) of PCT/EP2013/001341, filed May 7, 2013, which claims benefit of European Application No. 12003786.6, filed May 14, 2012, both of which are incorporated herein by reference in their entirety.

This invention relates to particles for electrophoretic displays, a process for their preparation, electrophoretic fluids comprising such particles, electrophoretic display devices comprising such fluids, and the use of the particles in optical, electrooptical, electronic, electrochemical, electrophotographic, electrowetting and electrophoretic displays and/or devices, in security, cosmetic, decorative or diagnostic applications.

EPDs (Electrophoretic Displays) and their use for electronic paper are known for a number of years. An EPD generally comprises charged electrophoretic particles dispersed between two substrates, each comprising one or more electrodes. The space between the electrodes is filled with a dispersion medium which is a different colour from the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels. Mainly black and white particles are used. Particles coated with a surface layer to promote good dispersibility in dielectric media are disclosed in WO 2004/067593, US 2011/0079756, U.S. Pat. No. 5,964,935, U.S. Pat. No. 5,932,633, U.S. Pat. No. 6,117,368, WO 2010/148061, WO 2002/093246, WO 2005/036129, US 2009/0201569, U.S. Pat. No. 7,236,290, JP 2009031329, U.S. Pat. No. 7,880,955, and JP 2008122468.

There continues to be a demand for improved electrophoretic fluids and a simple preparation of coloured and white reflective particles which can be easily dispersed in non-polar media. An improved route to provide such particles and new electrophoretic fluids has now been found. Fluid compositions containing these particles can be used in monochrome and colour electrophoretic displays (EPD).

The present invention relates to particles comprising organic or inorganic pigment core particles encapsulated by a micro-, meso- or macro-porous polymeric shell comprising monomer units of at least one polymerisable steric stabiliser, at least one co-monomer, optionally at least one charged co-monomer, optionally at least one polymerisable dye, and optionally at least one crosslinking co-monomer, a process for their preparation, the use of the particles in electrophoretic fluids, and electrophoretic display devices comprising these fluids. The subject matter of this invention specifically relates to white reflective particles, and to electrophoretic fluids and displays comprising such white reflective particles.

The invention provides a method to produce particles suitable for use in EPD which have controllable size, reflectivity, density, monodispersity, and steric stability and require no drying process to disperse in a solvent suitable for EPD. The method of the invention includes a porogen material in the polymerisation process. The result of this is that small pockets or pores are formed within the particles which provide particles with considerably lower average density than that with a polymeric shell without pores. The pores also have low refractive index which can improve the overall reflectivity of a particle by creating regions of low to high refractive index change.

The present invention provides pigment particles, especially white reflective particles which can be easily dispersed in non-polar media and show electrophoretic mobility. Particle size, polydispersity, and density can be controlled and the present incorporation of pigment into polymeric particles does neither require multiple process steps nor expensive drying steps, i.e. freeze drying. The present process involves one simple polymerisation step. The present process facilitates the formulation of electrophoretic fluids since it is done in a non-polar organic solvent instead of aqueous media. The particles can be prepared in the solvent of choice for EPD formulations, therefore no unwanted solvent contamination occurs and no disposal, or recycling of solvent is necessary. Particles of the invention are easily dispersed in dielectric, organic media, which enables switching of the particles in an applied electric field, preferably as the electrically switchable component of a full colour e-paper or electrophoretic display.

BRIEF DESCRIPTION OF THE DRAWINGS

FIG. 1 shows the density change depending on the acetonitrile content.

Highly reflective polymer particles can be produced by encapsulating a highly reflective inorganic particle in an organic polymer by a dispersion polymerisation. This yields a hybrid particle which exhibits excellent reflectivity where the inorganic material is encapsulated by a tough polymer shell. This tough shell prevents particle agglomeration.

Particles of the invention comprise sterical stabilisers which can be covalently bonded onto the pigment core particles. Advantageously, the present invention does not require custom synthesised stabilisers with difficult to control steric lengths and multistep complex syntheses with expensive or difficult to synthesise components.

In addition, the particles may have a homogeneous crosslinked network structure for solvent resistance, impact strength and hardness, high electrophoretic mobility in dielectric media, excellent switching behavior, and faster response times at comparable voltages.

The core particles can be selected to achieve different optical effects. Properties can vary from being highly scattering to being transparent. The pigments can be coloured including black or white.

Primarily, the invention provides white reflective particles by incorporating an inorganic material of sufficiently high refractive index and white reflectivity into an organic polymer based particle to yield a hybrid polymeric particle which exhibits good white reflective properties. Preferably, white reflective particles are used having a refractive index of $\geq 1.8$, especially $\geq 2.0$, are used. Especially titanium dioxide, zinc oxide, silicon dioxide, alumina, barium sulphate, zirconium dioxide, zinc sulfite, calcium carbonate, cerussite, kaolinite, diantimony trioxide and/or tin dioxide, especially titanium dioxide, can be used.

Preferably, titanium dioxide based pigments are used which could have the rutile, anatase, or amorphous modification, preferably rutile or anatase. Examples are: Sachtleben RDI-S, Sachtleben R610-L, Sachtleben LC-S, Kronos 2081, Kronos 2305, Sachtleben Hombitan Anatase, Sachtleben Hombitan Rutile, Du Pont R960, Du Pont R350, Du Pont R104, Du Pont R105, Du Pont R794, Du Pont R900, Du Pont R931, Du Pont R706, Du Pont R902+, Du Pont R103, Huntsman TR-81, Huntsman TR-28, Huntsman TR-92, Huntsman R-TC30, Huntsman R-FC5, Evonik P25, Evonik T805, Merck Eusolex T2000, Merck UV Titan M765. Preferably, Du Pont R960, Huntsman TR-92, and Sachtleben Hombitan Anatase are used.

Examples of pigments suitable to achieve colour or black or fluorescent are: Carbon black, chromium (III) oxide green, mixed oxides, cobalt blue spinel, ultramarine pigments, iron blue, iron (III) oxide red, iron (III) oxide orange, iron oxide hydroxide (FeOOH) yellow, iron oxide ($Fe_3O_4$) black, iron (II, III) oxide black. Organic pigments with structures based on carbazoles, perinones, vat pigments, benzimidazolones, isoindolinones, Cu-phthalocyanine, quinacridone, monoazo, disazo, azo pigment lakes, perylene, naphthalimide, quaterrylene or diketo-pyrrolopyrrole, thiazine indigo, polycyclic quinones are also suitable for the present invention.

Furthermore, the invention allows density control by tunability of the shell around the inorganic pigment. The amount of the organic material in the reaction can be increased relative to the inorganic pigment which results in a lower density particle, or if higher density is desired, the pigment ratio can be increased.

Pigments encapsulated within the particles are preferably well dispersed in a non-aggregated state in order to achieve the optimum optical properties. If the pigment is high density, the optimum loading of the pigment within polymer may not only be affected by the optical properties but also the density of the resulting particle in order to achieve improved bistability. Pigments are present in the particle (on weight of total particle) from 5-95%, preferably 20-60% and even more preferably 30-50%.

The pigment particles, especially titania particles, may be treated with a special surface modifying agent before polymerisation. The surface modifying agent requires suitable reactivity to the particle surface and towards a growing polymer chain. The modifying agent must also contain such organic functionality that provides more easily dispersible inorganic particles for the organic medium for polymerisation. Generally, reagents for controlled radical polymerisation such as ATRP (atom transfer radical polymerisation), NMP (nitroxide-mediated polymerisation) or RAFT (reversible addition fragmentation transfer polymerisation) could be used. However, most suitable for the present invention are reagents for RAFT polymerisation. RAFT polymerisation, RAFT agents, and the synthesis of RAFT agents are well known to the skilled person. Preferably, trithio and dithiocarbonates with functionality for reaction to the pigment particle surface are used for the particles of the invention. Although carbamates and xanthates can also be used, most preferably, carboxylic acid functional RAFT agents are used, preferably the following:

Formulas 1, 2, and 3

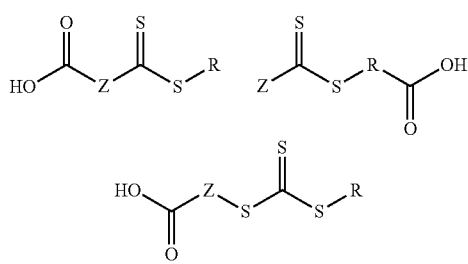

Especially, 4-((thiobenzoyl)sulfanyl)-4-cyano-pentanoic acid or 3-((thiododecanoyl)sulfanyl)-3-methyl-propanoic acid are used:

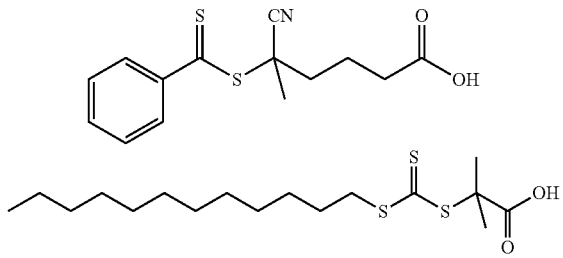

A further essential component of the present invention is a polymerisable steric stabiliser. The polymerisable steric stabilisers need to be soluble in non-polar solvents, particularly dodecane, and have some reactive functionality such that they take part in the polymerisation. This creates a particle with a covalently bound surface of sterically stabilising compounds providing stability during and after polymerisation. The polymerisable steric stabiliser can be used in a range of molecular weights which allows strict control over the steric barrier surrounding the particles to prevent aggregation. The polymerisable group incorporates irreversibly into the particles and is therefore anchored to the surface.

A typical polymerisable steric stabiliser of the invention is a poly(dimethylsiloxane) macro-monomer (PDMS). The poly(dimethylsiloxane) may comprise one or two polymerisable groups, preferably one polymerisable group.

The following stabiliser types could be used and are commercially available from Gelest Inc.:
Methacryloyloxypropyl terminated polydimethylsiloxanes (mws 380, 900, 4500, 10000, 25000) Methacryloyloxypropyl terminated polydimethylsiloxanes (mw 600), Methacryloyloxypropyl terminated polydimethylsiloxanes (1500, 1700), (3-acryloxy-2-hydroxypropoxypropyl) terminated PDMS (mw 600), Acryloxy terminated ethyleneoxide-dimethylsiloxane-ethyleneoxide ABA block copolymers (mw 1500, 1700), methacyloyloxypropyl terminated branched polydimethylsiloxanes (683), (methacryloxypropyl)methylsiloxanes-Dimethylsiloxane copolymers (viscosity 8000, 1000, 2000), (acryloxypropyl)methylsiloxane-dimethylsiloxanes copolymers (viscosity 80, 50), (3-acryloxy-2-hydroxypropoxypropyl)methylsiloxane-dimethylsiloxane copolymers (mw 7500), mono(2,3-epoxy)propyl ether terminated polydimethylsilxoanes (mw 1000, 5000), monomethacryloxypropyl terminated polydimethylsiloxanes asymmetric (mw 600, 800, 5000, 10000), monomethacryloxypropyl functional polydimethylsiloxanes-symmetric (mw 800), monomethacryloxypropyl terminated polytrifluoropropylmethylsiloxanes-symmetric (mw 800) monovinyl terminated polydimethylsiloxanes (mw 5500, 55000, monovinyl functional polydimethylsilxanes—symmetric (mw 1200).

Preferred polymerisable groups are methacrylate, acrylate, and vinyl groups, preferably methacrylate and acrylate groups. Most preferred are poly(dimethylsiloxane) methacrylates (PDMS-MA), especially methacryloyloxypropyl terminated PDMS-MAs as shown in Formulas 1 and 2, wherein n=5-10000. Most preferred are poly(dimethylsiloxanes) with one methacrylate group.

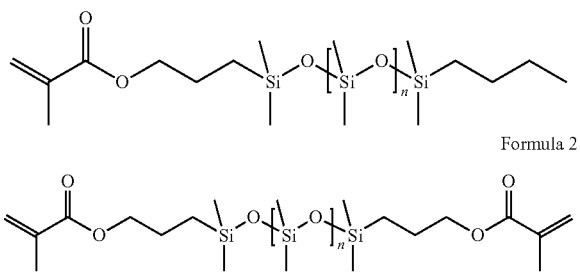

Formula 1

Formula 2

The polymerisable steric stabiliser of the invention preferably has a molecular weight in the range of 1000-50000, preferably 3500-35000, more preferably 5000-25000. Most preferred are methacrylate terminated polydimethylsiloxanes with a molecular weight of 10,000 or more.

The particles of the invention can be prepared from many polymer types. Preferably, monomers are used where the monomer is soluble in the reactive mixture and the polymer is insoluble in the reactive mixture with relatively high Tg. This allows hard composite particles to be formed which tend to be spherical in shape and have easily tunable size.

The main requirement for the polymer composition is that it needs to be produced from a monomer that is soluble but polymer insoluble in the EPD fluid, i.e. dodecane and can also provide some linkage to the surface of the titania during polymerisation. Low solubility of the polymer material in the EPD dispersion media reduces the tendency for ripening processes to take place and helps define the particle size and size dispersity.

The particles can be prepared from most monomer types, in particular methacrylates, acrylates, methacrylamides, acrylonitriles, α-substituted acrylates, styrenes and vinyl ethers, vinyl esters, propenyl ethers, oxetanes and epoxys but would typically be prepared from largest percentage to be monomer, then cross-linker, and include a charged monomer (e.g. quaternised monomer). Especially preferred is methyl methacrylate but many others could be used, the following are all examples of which could be used which are commercially available from the Sigma-Aldrich chemical company.

The following are all examples which could be used and which are commercially available from the Sigma-Aldrich chemical company. Mixtures of monomers may also be used.

Methacrylates:

Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol) methyl ether methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxyisopropyl methacrylates, 2-Hydroxypropyl 2-(methacryloyloxy)ethyl phthalate, Isobornyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl)propyl methacrylate, 3,3,5-Trimethylcyclohexyl methacrylate, Trimethylsilyl methacrylate, Vinyl methacrylate.

Preferably Methyl methacrylate (MMA), Methacrylic acid,

Ethyl methacrylate (EMA), and/or n-Butyl methacrylate (BMA) are used.

Acrylates:

Acrylic acid, 4-Acryloylmorpholine, [2-(Acryloyloxy)ethyl]trimethylammonium chloride, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, i(ethylene glycol) ethyl ether acrylate technical grade, Di(ethylene glycol) 2-ethylhexyl ether acrylate, 2-(Dimethylamino)ethyl acrylate, 3-(Dimethylamino)propyl acrylate, Dipentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly(propylene glycol) acrylate, Poly(propylene glycol) methyl ether acrylate Soybean oil, epoxidised acrylate, 3-Sulfopropyl acrylate potassium salt, Tetrahydrofurfuryl acrylate, 3-(Trimethoxysilyl)propyl acrylate, 3,5,5-Trimethylhexyl acrylate.

Preferably Methyl acrylate, acrylic acid, Ethyl acrylate (EMA), and/or n-Butyl acrylate (BMA) are used.

Acrylamides:

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl)trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl) acrylamide, N-(Isobutoxymethyl)acrylamide, N-Isopropylacrylamide, N-Isopropylmethacrylamide, Methacrylamide, N-Phenylacrylamide, N-[Tris(hydroxymethyl)methyl]acrylamide.

Styrenes

Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene, N,N-Dimethylvinylbenzylamine, 2,4-Diphenyl-4-methyl-1-pentene, 4-Ethoxystyrene, 2-Fluorostyrene, 3-Fluorostyrene, 4-Fluorostyrene, 2-Isopropenylaniline, 3-Isopropenyl-α,α-isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl)styrene, 4-(Trifluoromethyl)styrene, 2,4,6-Trimethylstyrene. Preferably Styrene and/or Divinyl benzene are used.

Vinyl Groups

3-Vinylaniline, 4-Vinylaniline, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl) trimethylammonium chloride, 4-Vinylbiphenyl, 2-Vinylnaphthalene, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate.

Other monomers which may be used are those which have groups to help stabilisation of the particles, e.g. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, Lauryl acrylate and fluorinated monomers of above.

Some of the monomers have groups for further reaction if so desired, e.g, Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis[4-(vinyloxy)butyl] adipate, Bis[4-(vinyloxy)butyl] 1,6-hexanediylbiscarbamate, Bis[4-(vinyloxy)butyl]isophthalate, Bis[4-(vinyloxy)butyl] (methylenedi-4,1-phenylene) biscarbamate, Bis[4-(vinyloxy)butyl] succinate, Bis[4-(vinyloxy)butyl]terephthalate, Bis[4-(vinyloxymethyl) cyclohexylmethyl] glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol) divinyl ether, Di(ethylene glycol) vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl]phosphate, Bisphenol A propoxylate diacrylate, 1,3-Butanediol diacrylate, 1,4-Butanediol diacrylate, 1,3-Butanediol dimethacrylate, 1,4-Butanediol dimethacrylate, N,N'-(1,2-Dihydroxyethylene)bisacrylamide, Di(trimethylolpropane) tetraacrylate, Diurethane dimethacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediylbis[oxy(2-hydroxy-3,1-propanediyl)] bisacrylate, Hydroxypivalyl hydroxypivalate bis[6-(acryloyloxy) hexanoate], Neopentyl glycol diacrylate, Pentaerythritol diacrylate, Pentaerythritol tetraacrylate, Pentaerythritol triacrylate, Poly(propylene glycol) diacrylate, Poly(propylene glycol) dimethacrylate, 1,3,5-Triacryloylhexahydro-1,3,5-triazine, Tricyclo[5.2.1.0]decanedimethanol diacrylate, Trimethylolpropane benzoate diacrylate, Trimethylolpropane ethoxylate methyl ether diacrylate, Trimethylolpropane ethoxylate triacrylate, Trimethylolpropane triacrylate, Trimethylolpropane trimethacrylate, Tris[2-(acryloyloxy)ethyl] isocyanurate, Tri(propylene glycol) diacrylate.

Optionally, the monomer composition comprises at least one charged co-monomer.

Examples of cationic monomers for particle stability and particle size control are 2-methacryloxy ethyl trimethyl ammonium chloride (MOTAC), acryloxy ethyl trimethyl ammonium chloride (AOTAC), [3-(Methacryloylamino) propyl]trimethylammonium chloride, [2-(Methacryloyloxy) ethyl]trimethylammonium methyl sulfate solution, tetraallyl ammonium chloride, diallyl dimethyl ammonium chloride, (Vinylbenzyl)trimethylammonium chloride. Preferably 2-methacryloxy ethyl trimethyl ammonium chloride (MOTAC) and acryloxy ethyl trimethyl ammonium chloride (AOTAC) are used.

Examples of anionic monomers are sodium, potassium or triethylamine salts of methacrylic acid, Acrylic acid, 2-(Trifluoromethyl)acrylic acid, 3-(2-Furyl)acrylic acid, 3-(2-Thienyl)acrylic acid, 3-(Phenylthio)acrylic acid, Poly (acrylic acid) potassium salt, Poly(acrylic acid) sodium salt, Poly(acrylic acid), Poly(acrylic acid, sodium salt) solution, trans-3-(4-Methoxybenzoyl)acrylic acid, 2-Methoxycinnamic acid, 3-Indoleacrylic acid, 3-Methoxycinnamic acid, 4-Imidazoleacrylic acid, 4-Methoxycinnamic acid, Poly(styrene)-block-poly(acrylic acid), Poly(acrylonitrile-co-butadiene-co-acrylic acid), dicarboxy terminated, Poly(acrylonitrile-co-butadiene-co-acrylic acid), dicarboxy terminated, glycidyl methacrylate diester, 2,3-Diphenyl-Acrylic Acid, 2-Me-Acrylic Acid, 3-(1-Naphthyl)Acrylic Acid, 3-(2,3,5,6-Tetramethylbenzoyl) Acrylic Acid, 3-(4-Methoxyphenyl)Acrylic Acid, 3-(4-Pyridyl)Acrylic Acid, 3-p-Tolyl-Acrylic Acid, 5-Norbornene-2-Acrylic Acid, Trans-3-(2,5-Dimethylbenzoyl)Acrylic Acid, Trans-3-(4-Ethoxybenzoyl)Acrylic Acid, Trans-3-(4-Methoxybenzoyl)Acrylic Acid, 2,2'-(1,3-Phenylene)Bis(3-(2-aminophenyl)Acrylic Acid), 2,2'-(1,3-Phenylene)Bis(3-(2-Aminophenyl)Acrylic Acid) hydrochloride, 2,2'-(1,3-Phenylene)Bis(3-(2-Nitrophenyl)Acrylic Acid), 2-[2-(2',4'-Difluoro[1,1'-Biphenyl]-4-Yl)-2-Oxoethyl] Acrylic Acid, 2-(2-(2-Chloroanilino)-2-Oxoethyl)-3-(4-Methoxyphenyl)Acrylic Acid, 2-(2-((2-Hydroxyethyl) Amino)-2-Oxoethyl)-3-(4-Methoxyphenyl)Acrylic Acid, 2-(2-(Cyclohexylamino)-2-Oxoethyl)-3-(4-Methoxyphenyl) Acrylic Acid.

A further co-monomer may be a polymerisable dye. In general the polymerisable dyes may be solvent soluble or water soluble and they may be anionic, cationic, zwitterionic or neutral. Polymerisable dyes consist of a chromophore, at least one polymerisable groups, optional linker groups (spacers), and optional groups to modify physical properties (like). Preferred polymerisable dyes are azo dyes, metallised dyes, anthraquinone dyes, phthalocyanine dyes, benzodifuranones dyes, Brilliant Blue derivatives, pyrroline dyes, squarilium dyes, triphendioxazine dyes or mixtures of these dyes, especially azo dyes, metallised dyes, anthraquinone dyes, phthalocyanine dyes, benzodifuranones dyes, pyrroline dyes, squarilium dyes or mixtures of these dyes. Preferably dyes with more than one polymerisable group are used. In principle any polymerisable dye can be used, preferable with more than one polymerisable group (most preferably with 2 polymerisable groups) and preferably with a methacrylate or acrylate function. Advantageously, the polymerisable dyes disclosed in WO2010/089057 and WO2012/019704 are used. Preferably dyes of Formulas (I')-(VI') are used:

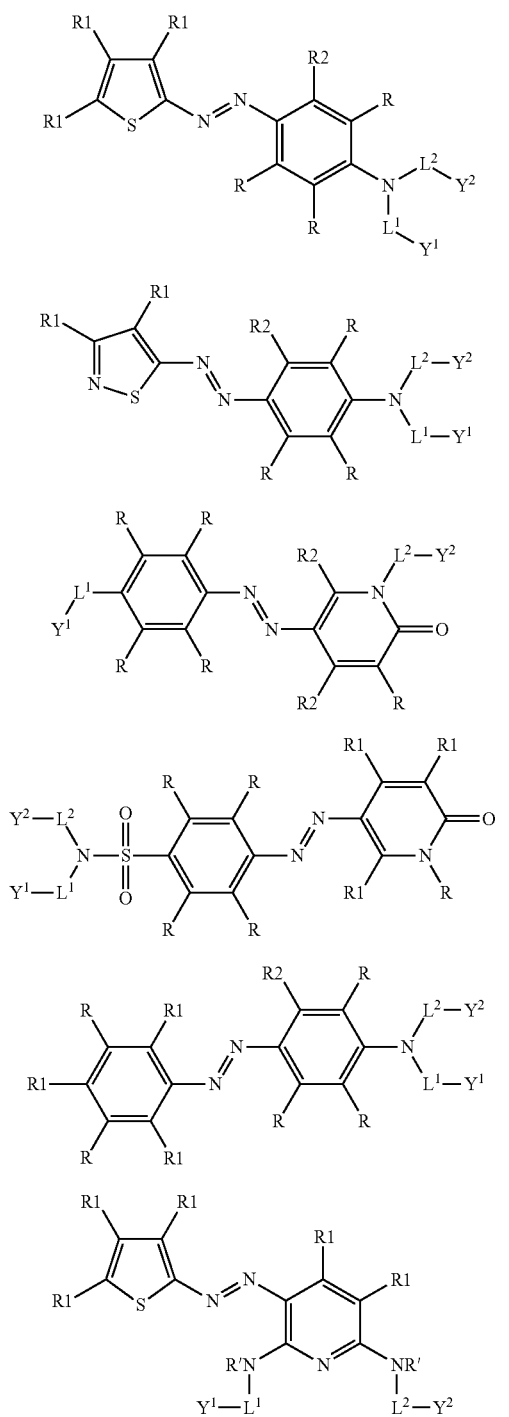

wherein R is H; R1 and R2 are independently of one another alkyl, preferably C1-C6 alkyl, —OR', —SR', —C(O)R', —C(O)OR', —NHCOR', —NO$_2$, —CN, with R' equal to H or alkyl, preferably C1-C6 alkyl, especially C1-C3 alkyl; $L^1$ and $L^2$ are independently of one another a single bond, C1-C6 alkyl, a polyether alkyl chain, or a combination thereof, preferably C2-C4 alkyl, especially C2 and C4 alkyl, especially identical groups $L^1$ and $L^2$ are preferred; and $Y^1$ and $Y^2$ are methyl acrylate or methyl methacrylate, especially identical groups $Y^1$ and $Y^2$ are preferred.

Especially preferred are polymerisable dyes of Formulas (I')-(VI') wherein R is H; R1 and R2 are independently of one another —CH$_3$, —NO$_2$, —OH, —CN, —COCH$_3$, —CO$_2$CH$_2$CH$_3$, —NHCOR'; $L^1$ and $L^2$ are, preferably identical, C2-C4 alkyl, and $Y^1$ and $Y^2$ are, preferably identical, methyl acrylate or methyl methacrylate, wherein R2 is preferably —CH$_3$, —OH or —NHCOR'.

Especially preferred co-monomers are methyl methacrylate, methyl acrylate, and methacrylic acid, acrylic acid, ethane-1,2 diacrylate, butane-1,4 diacrylate, hexane-1,6-diacrylate. Furthermore, mixtures of co-monomers described in the foregoing may be used. Preferred co-monomers mixtures comprise methyl methacrylate, methyl acrylate, methacrylic acid, acrylic acid, ethane-1,2 diacrylate, butane-1,4 diacrylate, hexane-1,6-diacrylate, trimethylolpropane triacrylate, 2-methacryloxy ethyl trimethyl ammonium chloride (MOTAC) and/or acryloxy ethyl trimethyl ammonium chloride (AOTAC).

A further subject of the invention is a process for the preparation of particles comprising organic or inorganic pigment core particles encapsulated by a porous polymeric shell comprising monomer units of at least one polymerisable steric stabiliser, at least one co-monomer, optionally at least one charged co-monomer, optionally at least one polymerisable dye, and optionally at least one crosslinking co-monomer. The present process comprises the following steps:

a) dispersing at least one organic or inorganic pigment particle in a solution of at least one polymerisable steric stabiliser in a non-polar organic solvent;

b) adding at least one co-monomer, at least one porogen, at least one initiator, and optionally at least one chain transfer agent;

c) subjecting the dispersion of step b) to heating and sonication for polymerisation, d) optionally washing by repeated centrifugation and redispersion in fresh solvent, and e) optionally isolating the resulting coated particles.

Advantageously, the density of the particles can be reduced by the use of a suitable porogen. The porogen forms an intimate part of the particle during polymerisation, leaving small pockets or pores which are filled with some solvent, reducing the overall density of the particle.

The use of porogen could have further benefit to the process by being able to modify refractive index to affect the overall reflectivity. If a pocket of low refractive index is adjacent to a high refractive index pigment core, the reflectivity of the pigment is significantly increased because reflectivity is a function of refractive index difference.

Further to this, the pores can optionally be functionalized. They can for example contain materials such as dyes, other pigments, UV stabilising agents, charging agents and other additives to increase functionality and modify the properties of the particles.

A porogen is defined as a compound used to lower the overall density of a material by creating porosity within this material (incompatibility between both compounds). In the specific case of colloidal polymer particles (solid particles dispersed in a liquid continuous phase), the porogen is most of the time a liquid (immiscible with both the colloidal particles and the continuous phase) of low density. The aim of the porogen in this case is to allow an improved density match between colloidal particles and the continuous phase. If lowering density is not fundamental for a polymer colloidal particle (small density difference between most polymer colloidal particles and continuous phase), when making hybrid inorganic-organic colloidal particles (introduction of TiO$_2$ nanoparticles) the high density of the titanium dioxide (around 4 g·cm$^{-3}$) can drastically increase the overall particle density leading to fast settling. The efficient use of a porogen becomes then essential to maintain good colloidal particles dispersion.

Herein, the porogen needs to be immiscible with the continuous phase (dodecane, 0.75 g·cm$^{-3}$) and the polymer (pMMA, 1.18 g·cm$^{-3}$) but has to be miscible with the monomer phase (MMA). As the porogen is used for overall particle density reduction, low density solvents are the best candidates. Dodecane being a non polar solvent, polar solvents like dimethyl sulfoxide (DMSO) (1.1004 g·cm$^{-3}$), dimethyl formamide (DMF) (0.944 g·cm$^{-3}$), methanol (0.792 g·cm$^{-3}$), ethanol (0.789 g·cm$^{-3}$) or acetonitrile (0.787 g·cm$^{-3}$) can be reasonable choices. After colloidal particle formation the porogen becomes trapped within the core of the particles creating some porosity. The incorporation of TiO$_2$ within the pMMA particles should not interfere with the porogen.

Preferred porogens are polar organic solvents, especially dimethyl sulfoxide, dimethylformamide, methanol, ethanol and/or acetonitrile.

Preferable example is acetonitrile.

Particles according to the invention preferably have a density of ≤2.0 g/ml, especially 0.7-1.3 g/ml, most preferably 0.7-1.0 g/ml.

This process provides pigment particles, especially titania embedded in a porous polymeric shell by addition of a porogen to the particles in the polymerisation process.

The present process can also be used to prepare porous polymer particles without organic or inorganic pigment core particles. This process comprises the following steps and is shown in Examples 1-3:

a') solubilising at least one polymerisable steric stabiliser in a non-polar organic solvent;
b') preparing a solution of a co-monomer, an initiator, and optionally a chain transfer agent in a solvent;
c') heating the solution of step a');
d') adding the solution of step b') to the hot solution of step c') for polymerisation;
e') optionally washing by repeated centrifugation and redispersion in fresh solvent, and
f') optionally isolating the resulting coated particles.

The preparation process of the particles of the invention is done directly in a non-polar fluid suitable for EPD formulations and in the presence of at least one porogen described above. No expensive drying steps are necessary. The particles can then also be easily formulated for EPD fluids by addition of any required surfactants directly into the dispersion without necessarily changing solvents. Furthermore, a polymerisable steric stabiliser which has reactivity to the polymer and is highly soluble in the non-polar fluid is used in the process for the preparation of the particles. This results in a covalently bonded layer on the outer surface of the pigment core particle which effects simple dispersion in non-polar EPD media.

Size and polydispersity of the particles according to the invention can be controlled through control of the polymerisation and the use of ultrasound. Through correct design of the experiment and quantities of reagents used in synthesis, particles can be created which exhibit low polydispersity and controllable sizes over a wide range. The use of ultrasound in the reaction can enhance this. Typical process conditions are known to experts in the field.

The particles of the invention are preferably prepared using a dispersion polymerisation. This is a convenient single step method of preparing monodisperse coloured particles. The solvent for the dispersion can be chosen primarily on the basis of dielectric constant, refractive index, density and viscosity. A preferred solvent choice would display a low dielectric constant (<10, more preferably <5), high volume resistivity (about 10$^{15}$ ohm-cm), a low viscosity (less than 5 cst), low water solubility, a high boiling point (>80° C.) and a refractive index and density similar to that of the undyed particles. Tweaking these variables can be useful in order to change the behaviour of the final application. Preferred solvents are often non-polar hydrocarbon solvents such as the Isopar series (Exxon-Mobil), Norpar, Shell-Sol (Shell), Sol-Trol (Shell), naphtha, and other petroleum solvents, decalin, tetralin as well as long chain alkanes such as dodecane, hexadecane, tetradecane, decane and nonane. These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachloroethylene, carbon tetrachloride, 1,2,4-trichlorobenzene and similar solvents. The solvent which is particularly suitable is a dodecane.

The selection of the polymerisation conditions depends on the required size and size distribution of the particles. Adjustment of polymerisation conditions is well known to someone skilled in the art.

Preferably, a batch polymerisation process is used wherein all reactants are completely added at the outset of the polymerisation process. In such process only relatively few variables have to be adjusted for a given formulation. Preferred changes which can be made in such cases are to the reaction temperature, reactor design and the type and speed of stirring.

Thus, a batch polymerisation process is used for manufacture versus a semi-continuous batch process because of limited versatility and simple evaluations of reaction formulation.

Preferably the polymerisation according to the invention is a free radical polymerisation.

Typical process conditions are described for titanium dioxide particles coated according to the invention. The pigment particles may be treated with a surface modifying agent before polymerisation. Functionalised or unfunctionalised titanium dioxide is added to a non-polar hydrocarbon solvent, preferably dodecane and a PDMS-methacrylate. The solution is lightly sonicated to disperse the pigment. Co-monomers, preferably MMA, a porogen, preferably acetonitrile, and a chain transfer agent, preferably octanethiol are then added to the solution which is stirred under nitrogen, then heated to 60-90° C., preferably 85° C. in a sonic bath. Sonics are applied to the reaction and an initiator, preferably azobisisobutyronitrile is added to initiate polymerisation. The reaction is allowed to proceed for approximately 2-6, preferably 4 hours after which time the reaction is cooled and particles isolated by centrifugation. Particles are often monodisperse and any particles which are free of pigment can be separated by centrifugation if required.

The concentration of the final particles in the non-polar solvent can be increased if desired by centrifugation, i.e. forced settling of the particles and pouring off excess solvent, or a stirred cell filtration system can be used. The dispersion can be washed with a non-polar solvent if required. If necessary, the particles are simply separated from the reaction suspension by filtration, preferably by pouring the suspension through a pore size filter, i.e. a 0.1 µm pore size filter, or the particles can be cleaned by centrifuging.

Usually, a polymerisation composition for the preparation of particles according to the invention comprises at least one organic or inorganic pigment particle, at least one polymerisable steric stabiliser, at least one co-monomer, at least one porogen, at least one initiator, optionally at least one charged co-monomer, optionally at least one polymerisable dye, optionally at least one chain transfer agent, and optionally at least one crosslinking co-monomer in a non-aqueous solvent.

Advantageously, the polymerisable compositions of the invention comprise a combination of the above-mentioned preferred compounds for inorganic pigment particles, porogen, polymerisable steric stabiliser, co-monomer, and cross-linking co-monomer. Most preferred are combinations of titanium dioxide in the rutile or anatase modification, acetonitrile as porogen, methacrylate terminated polydimethylsiloxanes with a molecular weight of 10,000 or more, and methyl methacrylate.

Charging the polymer can also be facilitated by using an initiator which is charged leaving that charge residing as an end-group on the polymer. Such examples are 2,2'-azobis(2-methylpropionamidine)dihydrochloride (V-50) (Wako Chemicals), potassium peroxodisulfate (KPS), ammonium peroxodisulfate (APS), sodium peroxodisulfate (SPS), 2,2'-azobiscyanovaleric acid (ACVA) (Wako Chemicals), 2,2'-azobis[2-(2-imidazolin-2-yl)propane]dihydrochloride (VA044) (Wako Chemicals).

Charging does not have to come from the initiator fragment so initiators which can also be used are those such as 2,2'-azobis(isobutyronitrile) (AIBN) (Wako Chemicals), 2,2'-azobis(2-methylbutyronitrile) (Vazo 67) (Wako Chemicals) and benzoyl peroxide.

Optionally, the polymerisable compositions of the invention comprise a chain transfer agent, e.g. catalytic chain transfer reagents, alkyl and aryl thiols, alcohols and carboxylic acids, halogenated organics and selected inorganic salts. Examples of suitable chain transfer agents are 2-propanol, adipic acid, thioglycolic acid, 2-mercaptoethanol, sodium hypochlorite, carbon tetrachloride and heavy metal poryphyrins, particularly cobalt poryphyrins preferably octane thiol.

The polymerisable composition of the invention usually comprises 0.1-80%, preferably 5-60%, by weight of at least one organic or inorganic pigment particle, 0.1-50%, preferably 10-40%, by weight of at least one porogen, 0.1-50%, preferably 20-40%, by weight of at least one polymerisable steric stabiliser, 40-95%, preferably 50-90%, by weight of co-monomer, optionally 1-40%, preferably 1-10%, by weight of cross-linking co-monomer, optionally 1-30%, preferably 1-10%, by weight of charged co-monomer, optionally 0-3%, by weight of chain transfer agent, and 0.1-10%, preferably 0.1-7.5%, by weight of initiator, all percentages are based on the total weight of the polymerisable composition (except solvent).

All components added to the synthesis are readily available from chemical suppliers allowing facile tunability of parameters to design and prepare particles with desired properties. Properties can be selected in many cases by simply choosing from a range of commercially available components from which to synthesise the particles.

Polymer particles prepared according to the invention are preferably spherical particles with a size (diameter) in the range of 50-1200 nm, preferably 400-1000 nm, especially 400-700 nm, and preferably with a monodisperse size distribution.

Smaller or larger particles can be further separated if required by centrifugation.

Particle sizes are determined by photon correlation spectroscopy of hydrocarbon particle dispersions by a common apparatus such as a Malvern NanoZS particle analyser or preferably by SEM (Scanning Electron Microscopy) and image analysis.

Particles of the invention are primarily designed for use in electrophoretic displays, especially for use in mono, bi or polychromal electrophoretic devices. A typical electrophoretic display comprises an electrophoretic fluid comprising the particles dispersed in a low polar or non-polar solvent along with additives to improve electrophoretic properties, such as stability and charge. Examples of such electrophoretic fluids are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

The particles of the invention, especially the presented white reflective particles may be used in combination with a dyed fluid, with additional particles such as oppositely charged black particles, with oppositely charged coloured particles or with equally charged coloured particles and oppositely charged black particles for example. The particles of the invention, especially the present white reflective particles may be used for example in combination with coloured or black polymer particles.

Preferably these additional particles such as black or coloured polymer particles comprise a polymerised or co-polymerised dye. Especially coloured copolymers particles comprising monomer units of at least one monomer, of at least one polymerisable dye, optionally of at least one charged co-monomer, and optionally of at least one cross-linking co-monomer are preferred. The polymerisable dye comprises preferably a chromophore, preferably an azo group, anthraquinone group or phthalocyanine group, one or more polymerisable groups, and optional linker groups. To enhance the surface stabilisation or steric repulsions of the coloured polymeric particles in a non-polar continuous phase, a steric stabiliser is preferably incorporated into the coloured polymer particles. Especially, the polymer particles described in WO 2009/100803, WO 2010/089057, WO 2010/089058, WO 2010/089059, WO 2010/089060, WO 2011/154103 and/or WO 2012/019704 are suitable for incorporation in the CSD polymers of the invention. Preferably, polymer particles described in WO 2010/089057 and/or WO 2012/019704 may be used.

Typical additives to improve the stability of the fluid (either by steric stabilisation or by use as a charging agent) are known to experts in the field and include (but are not limited to) the Brij, Span and Tween series of surfactants (Aldrich), Infineum surfactants (Infineum), the Solsperse, Ircosperse and Colorburst series (Lubrizol), the OLOA charging agents (Chevron Chemicals) and Aerosol-OT (Aldrich). Preferable surfactant additives in this work are Solsperse range and A-OT, and even more preferably Solsperse 17,000, 13650, 11000 and Solplus K500, A-OT and Span 85. Typical surfactants used in this process are cationic, anionic, zwitterionic or non-ionic with a hydrophilic portion usually termed the head group which is mono-, di- or polysubstituted with a hydrophobic portion usually termed the tail. The hydrophilic head group of the surfactant in this process can be, but is not limited to being, made up of derivatives of sulfonates, sulfates, carboxylates, phosphates, ammoniums, quaternary ammoniums, betaines, sulfobetaines, imides, anhydrides, polyoxyethylene (e.g. PEO/PEG/PPG), polyols (e.g. sucrose, sorbitan, glycerol etc), polypeptides and polyglycidyls. The hydrophobic tail of the surfactant in this process can be, but is not limited to being, made up of straight and branched chain alkyls, olefins and polyolefins, rosin derivatives, PPO, hydroxyl and polyhydroxystearic acid type chains, perfluoroalkyls, aryls and mixed alkyl-aryls, silicones, lignin derivatives, and partially unsaturated versions of those mentioned above. Surfactants for this process can also be catanionic, bolaforms, gemini, polymeric and polymerisable type surfactants.

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Adjustment of these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachloroethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are Aerosol OT (Aldrich), Span 85 (Aldrich), and dodecane (Sigma Aldrich).

The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767 and WO 2005/017046. The Electrophoretic fluid is then incorporated into an Electrophoretic display element by a variety of pixel architectures, such as can be found in C. M. Lampert, Displays; 2004, 25(5) published by Elsevier B.V., Amsterdam.

The Electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The coloured and white reflective polymer particles according to the present invention are suitable for all known electrophoretic media and electrophoretic displays, e.g. flexible displays, TIR-EPD (total internal reflection electrophoretic devices), one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

Particles of the invention may also be used in optical, electrooptical, electronic, electrochemical, electrophotographic, electrowetting displays and/or devices, e.g. TIR (total internal reflection electronic devices), and in security, cosmetic, decorative, and diagnostic applications. The use in electrowetting displays is preferred. Electrowetting (ew) is a physical process where the wetting properties of a liquid droplet are modified by the presence of an electric field.

This effect can be used to manipulate the position of a coloured fluid within a pixel. For example, a nonpolar (hydrophobic) solvent containing colourant can be mixed with a clear colourless polar solvent (hydrophilic), and when the resultant biphasic mixture is placed on a suitable electrowetting surface, for example a highly hydrophobic dielectric layer, an optical effect can be achieved. When the sample is at rest, the coloured non-polar phase will wet the hydrophobic surface, and spread across the pixel. To the observer, the pixel would appear coloured. When a voltage is applied, the hydrophobicity of the surface alters, and the surface interactions between the polar phase and the dielectric layer are no longer unfavourable. The polar phase wets the surface, and the coloured non-polar phase is thus driven to a contracted state, for example in one corner of the pixel. To the observer, the pixel would now appear transparent. A typical electrowetting display device consists of the particles in a low polar or non-polar solvent along with additives to improve properties, such as stability and charge. Examples of such electrowetting fluids are described in the literature, for example in WO2011/017446, WO 2010/104606, and WO2011075720.

The disclosures in the cited references are expressly also part of the disclosure content of the present patent application. In the claims and the description, the words "comprise/comprises/comprising" and "contain/contains/containing" mean that the listed components are included but that other components are not excluded. The following examples explain the present invention in greater detail without restricting the scope of protection.

EXAMPLES

All materials and solvents used are sourced from Sigma-Aldrich and used without further purification unless otherwise stated. TiPure R960 titanium dioxide is sourced from Du Pont and is used as supplied, TiOxide TR-92 is obtained from Huntsman and is used as supplied, Hombitan Anatase is supplied by Sachtleben and is used as supplied. Polydimethylsiloxane-methacrylate (PDMS-MA) with a molecular weight of 10,000 is obtained from Gelest and used without further purification.

The particle density is estimated using a LUMisizer which is basically an analytical centrifuge. The density is extrapolated from settling velocity using the Stokes' law:

$$\rho_p = \frac{18\eta v}{d^2 g} + \rho_f$$

where $\rho_p$ and $\rho_f$ are the fluid density and particle density respectively, $\eta$ is the fluid viscosity, v is the particle velocity, d is the particle diameter and g is the gravitational acceleration. The analysis parameters are: 255 steps at 15 seconds interval and at 25° C.; the rotation speeds are 2000 rpm for pure pMMA particles in dodecane and 200 to 500 rpm for pMMA particles containing $TiO_2$ nanoparticles.

Particle Size is Measured by SEM.

The characterisation of the formulations is performed using a Malvern NanoZS particle analyser. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Example 1

Synthesis of pMMA Particles Containing 5% (v/v vs MMA) Acetonitrile

PDMS-MA (mw 10,000) (2.08 g) is solubilised in dodecane (100.0 mL) in a 250 mL round bottom flask and a magnetic stirrer is added. Separately a solution of methyl methacrylate monomer (11.0 mL, 0.093 mol) (inhibitor removed), AIBN (107 mg, 0.65 mmol), octanethiol chain transfer agent (126 µL, 0.73 mmol) and acetonitrile (0.55 mL) is prepared in a 50 mL round bottom flask. PDMS-MA-dodecane and MMA-AIBN-octanethiol-acetonitrile solutions are sealed with septums. These round bottom flasks are placed in an ice bath and nitrogen bubbling is applied for 30 minutes. The PDMS-MA-dodecane solution is then placed in a dry syn heating block and heated at 80° C. The MMA-AIBN-octanethiol-acetonitrile solution is then added to the hot PDMS-MA-dodecane solution. The reaction is carried out for 4 hours at 80° C. and magnetic stirring (300 rpm) and nitrogen.

The particles are cleaned by centrifugation. Centrifugations are carried out at 10,000 rpm for 10 minutes, replacing the supernatant with dodecane. Centrifugation/redispersion is repeated 3 times. Average particle size obtained by SEM: 720 nm.

Particle density estimated using a LUMisizer: 1.070 mg/mL.

Example 2

Synthesis of pMMA Particles Containing 10% (v/v vs MMA) Acetonitrile

PDMS-MA (mw 10,000) (2.08 g) is solubilised in dodecane (100.0 mL) in a 250 mL round bottom flask and a magnetic stirrer is added. Separately a solution of methyl methacrylate monomer (11.0 mL, 0.093 mol) (inhibitor removed), AIBN (107 mg, 0.65 mmol), octanethiol chain transfer agent (126 µL, 0.73 mmol) and acetonitrile (1.1 mL) is prepared in a 50 mL round bottom flask. PDMS-MA-dodecane and MMA-AIBN-octanethiol-acetonitrile solutions are sealed with septums. These round bottom flasks are placed in an ice bath and nitrogen bubbling is applied for 30 minutes. The PDMS-MA-dodecane solution is then placed in a dry syn heating block and heated at 80° C. The MMA-AIBN-octanethiol-acetonitrile solution is then added to the hot PDMS-MA-dodecane solution. The reaction is carried out for 4 hours at 80° C. and magnetic stirring (300 rpm) and nitrogen.

The particles are cleaned by centrifugation. Centrifugations are carried out at 10,000 rpm for 10 minutes, replacing the supernatant with dodecane. Centrifugation/redispersion is repeated 3 times. Average particle size obtained by SEM: 810 nm.

Particle density estimated using a LUMisizer: 1.018 g/mL.

Example 3

Synthesis of pMMA Particles Containing 15% (v/v vs MMA) Acetonitrile

PDMS-MA (mw 10,000) (2.08 g) is solubilised in dodecane (100.0 mL) in a 250 mL round bottom flask and a magnetic stirrer is added. Separately a solution of methyl methacrylate monomer (11.0 mL, 0.093 mol) (inhibitor removed), AIBN (107 mg, 0.65 mmol), octanethiol chain transfer agent (126 µL, 0.73 mmol) and acetonitrile (2.2 mL) is prepared in a 50 mL round bottom flask. PDMS-MA-dodecane and MMA-AIBN-octanethiol-acetonitrile solutions are sealed with septums. These round bottom flasks are placed in an ice bath and nitrogen bubbling is applied for 30 minutes. The PDMS-MA-dodecane solution is then placed in a dry syn heating block and heated at 80° C. The MMA-AIBN-octanethiol-acetonitrile solution is then added to the hot PDMS-MA-dodecane solution. The reaction is carried out for 4 hours at 80° C. and magnetic stirring (300 rpm) and nitrogen.

The particles are cleaned by centrifugation. Centrifugations are carried out at 10,000 rpm for 10 minutes, replacing the supernatant with dodecane. Centrifugation/redispersion is repeated 3 times. Average particle size obtained by SEM: 820 nm.

Particle density estimated using a LUMisizer: 0.946 g/mL.

Density change depending on acetonitrile content is shown in FIG. 1.

Example 4

Synthesis of pMMA Particles Containing 10% (w/v vs MMA) Du Pont R960 Pigment and 40% (v/v vs MMA) Acetonitrile PDMS-MA (mw 10,000) (2.08 g) is solubilised in dodecane (100.0 mL) in a 250 mL round bottom flask and a magnetic stirrer is added. Then Du Pont R960 $TiO_2$ (1.2 g) is added to PDMS-MA-dodecane solution. The solution is then dispersed for 30 minutes under ultrasound using a Fisherbrand 11201 ultrasonic bath at 100% power and 37 Hz. Then Methyl methacrylate monomer (11.0 mL, 0.093 mol) (inhibitor removed), AIBN (107 mg, 0.65 mmol), acetonitrile (7.3 mL) and octanethiol chain transfer agent (126 µL, 0.73 mmol) are added and Nitrogen bubbling is applied for 30 minutes, the round bottom flask being placed in an ice bath. The round bottom flask is finally placed in a dry syn heating block at 80° C. and the reaction is carried out for 4 hours at 80° C. and magnetic stirring (300 rpm), nitrogen.

The particles are cleaned by centrifugation. Centrifugations are carried out at 10,000 rpm for 10 minutes, replacing the supernatant with dodecane. Centrifugation/redispersion is repeated 3 times. Average particle size obtained by SEM: 360 nm.

Particle density estimated using a LUMisizer: 1.6 g/mL.

Example 5

Synthesis of pMMA Particles Containing 30% (w/v vs MMA) RAFT Functionalised Titanium Dioxide Pigment and 20% (w/v vs MMA) Acetonitrile

Example 5a

Trithiocarbonate Synthesis

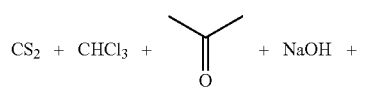

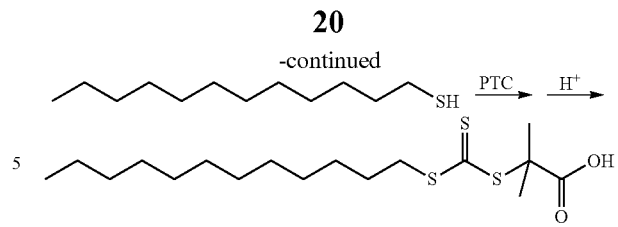

1-Dodecanethiol (47.8 ml, 0.2 mol) and Aliquot 336 (3.24 g, 0.008 mol) are stirred in acetone (250 ml) under nitrogen and at low temperature (between 0 and 10° C.). A concentrated aqueous solution of sodium hydroxide (50 wt %) (17.0 g, 0.21 mol) is slowly added dropwise and stirred for an additional 30 minutes after complete addition. Carbon disulfide (12 ml, 0.2 mol) as a solution in acetone (50 ml) is then added dropwise. Chloroform (25 ml) and a concentrated aqueous solution of sodium hydroxide (50 wt %) (80 g, 1 mol) are successively added and the stirred for 12 hours. Deionised water (300 ml) and 37% HCl (50 ml) are then added. The acetone is then removed and the solid is filtered. The solid is dissolved in 500 mL of isopropanol and filtered again. After solvent removal, the product is purified by recrystallisation in hexane. The pure product is obtained as a bright crystalline yellow powder. Yield: 64%.

$^1$H NMR (CDCl$_3$): 13.02 (1H, s), 3.40 (2H, t), 1.75 (6H, s), 1.35-1.42 (20H, m), 0.98 (3H, t).

Example 5b

Titania Modification with Trithiocarbonate

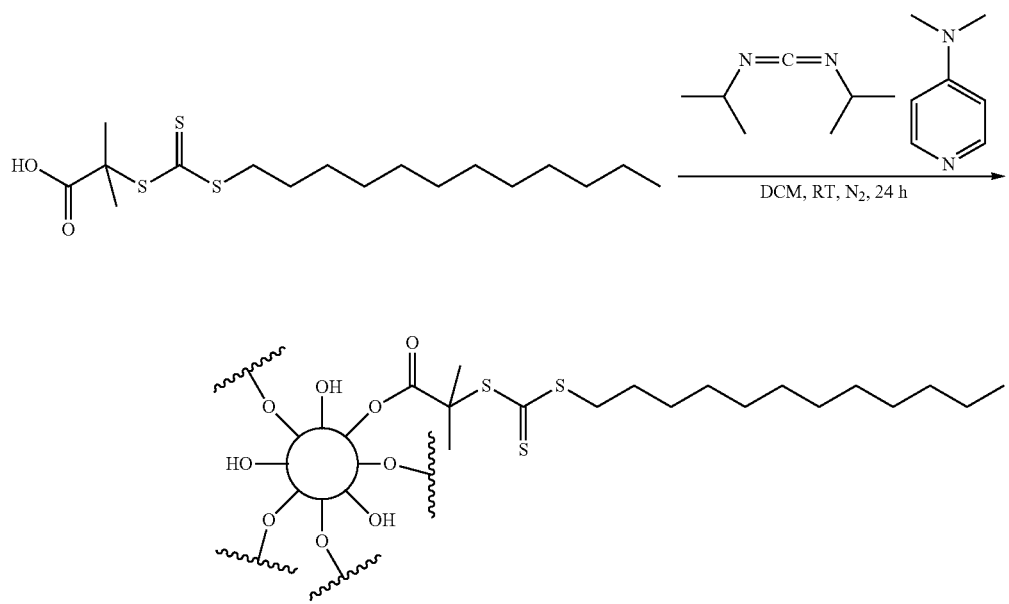

Titanium dioxide (3.50 g, 0.044 mol) is stirred under nitrogen in dichloromethane (40 ml) in the presence of "example 3" trithiocarbonate RAFT agent (336.0 mg, 0.92 mmol) agent and N,N'-diisopropylcarbodiimide (76.9 mg, 0.61 mmol), 4-Dimethylaminopyridine (24 mg, 0.20 mmol) is then added dropwise at 0° C. After complete addition, the reaction mixture is stirred at room temperature for 24 hours. After reaction, the surface modified $TiO_2$ particles are purified by repeated centrifugation. The product is obtained as a yellow powder after drying at 40° C. under reduced pressure. Yield: 70%.

Example 5c

Synthesis of pMMA Particles

PDMS-MA (mw 10,000) (1.3 g) is solubilised in dodecane (62.5 mL) in a 250 mL three neck round bottom flask and then RAFT (trithiocarbonate) functionalised Du Pont R960 $TiO_2$ (2.25 g) is added to PDMS-MA-dodecane solution. A centrifugal shaft stirrer is then fitted to the 3-necked round bottom flask and the solution is dispersed for 30 minutes under ultrasound using a Fisherbrand 11201 ultrasonic bath at 100% power and 37 Hz. Methyl methacrylate monomer (6.875 mL, 0.058 mol) (inhibitor removed), AIBN (66.9 mg, 0.41 mmol), acetonitrile (1.72 mL) and octanethiol chain transfer agent (78.6 µL, 0.45 mmol) are then added and Nitrogen bubbling is then applied for 30 minutes, the round bottom flask being placed in an ice bath. The round bottom flask is finally placed in the ultrasonic bath at 80° C., 100% power and 37 Hz, and the reaction is carried out for 4 hours at 80° C. and mechanical stirring (300 rpm), nitrogen and ultrasound.

The particles are cleaned by centrifugation. Centrifugations are carried out at 10,000 rpm for 10 minutes, replacing the supernatant with dodecane. Centrifugation/redispersion is repeated 3 times. Average particle size obtained by SEM: 680 nm.

Particle density estimated using a LUMisizer: 1.4 g/mL.

Example 6

Formulation Example of Example 1

A 3 wt % particle/3 wt % Aerosol OT solution from example 1 is prepared in dodecane. The solution is mixed for 30 minutes on a roller mixer and diluted in dodecane. The zetapotential of this particle is determined to be −40 mV. A 3 wt % particle/3 wt % SPAN85 solution from example 1 is prepared in dodecane. The solution is mixed for 30 minutes on a roller mixer and diluted in dodecane. The zetapotential of this particle is determined to be 80 mV.

Example 7

Formulation Example of Example 2

A 3 wt % particle/3 wt % Aerosol OT solution from example 2 is prepared in dodecane. The solution is mixed for 30 minutes on a roller mixer and diluted in dodecane. The zetapotential of this particle is determined to be −61 mV. A 3 wt % particle/3 wt % SPAN85 solution from example 2 is prepared in dodecane. The solution is mixed for 30 minutes on a roller mixer and diluted in dodecane. The zetapotential of this particle is determined to be 86 mV.

Example 8

Formulation Example of Example 3

A 3 wt % particle/3 wt % Aerosol OT solution from example 3 is prepared in dodecane. The solution is mixed for 30 minutes on a roller mixer and diluted in dodecane. The zetapotential of this particle is determined to be −56 mV. A 3 wt % particle/3 wt % SPAN85 solution from example 3 is prepared in dodecane. The solution is mixed for 30 minutes on a roller mixer and diluted in dodecane. The zetapotential of this particle is determined to be 83 mV.

The invention claimed is:

1. Particles consisting of organic or inorganic pigment core particles encapsulated by a porous polymeric shell consisting of monomer units of at least one polymerisable steric stabiliser, at least one co-monomer, optionally at least one polymerisable dye, wherein the particles have a density of ≤2.0 g/ml and wherein pores in the polymeric shell of the particles are at least partially filled with a polar organic solvent, and wherein the particles are formed from a dispersion comprising 0.1-80% by weight of at least one organic or inorganic pigment particle, 0.1-50% by weight of at least one polar organic solvent, 0.1-50% by weight of at least one polymerisable steric stabiliser, and 40-95% by weight of co-monomer based on the total weight of the dispersion except solvent.

2. The particles according to claim 1, wherein the polymerisable steric stabiliser is a poly(dimethylsiloxane) macromonomer with at least one polymerisable group and a molecular weight in the range of 1000-50000.

3. The particles according to claim 1, wherein the polymerisable steric stabiliser is a mono-methacrylate terminated poly-dimethylsiloxanes.

4. The particles according to claim 1, wherein the pigment core particle is titanium dioxide in the rutile, anatase, or amorphous modification or carbon black.

5. The particles according to claim 1, wherein the porous polymeric shell is linked to the surface of the organic or inorganic pigment core particles by at least one reagent for controlled radical polymerisation.

6. The particles according to claim 1, wherein the particles have a diameter of 400-1000 nm.

7. A process for the preparation of particles according to claim 1 comprising
   a) dispersing at least one organic or inorganic pigment particle in a solution of at least one polymerisable steric stabiliser in a non-polar organic solvent;
   b) adding at least on co-monomer, at least one porogen, wherein the at least one porogen is a polar organic solvent, optionally at least one polymerisable dye, at least one initiator, and optionally at least one chain transfer agent;
   c) subjecting the dispersion of step b) to heating and sonication for polymerisation,
   d) optionally washing by repeated centrifugation and redispersion in fresh solvent, and
   e) optionally isolating the resulting coated particles.

8. A method comprising utilizing the particles prepared by a process according to claim 7 in optical, electrooptical, electronic, electrochemical, electrophotographic, electrowetting and electrophoretic displays and/or devices, and in security, cosmetic, decorative, and diagnostic applications.

9. An electrophoretic fluid comprising particles prepared by a process according to claim 7.

10. The process for the preparation of particles according to claim 7, wherein the dispersion comprises 10-40% by weight of at least one porogen.

11. A method comprising utilizing the particles according to claim 1 in optical, electrooptical, electronic, electrochemical, electrophotographic, electrowetting and electrophoretic displays and/or devices, and in security, cosmetic, decorative, and diagnostic applications.

12. An electrophoretic fluid comprising particles according to claim 1.

13. An electrophoretic display device comprising an electrophoretic fluid according to claim 12.

14. An electrophoretic display device according to claim 13, wherein the electrophoretic fluid is applied by a technique selected from inkjet printing, slot die spraying, nozzle spraying, and flexographic printing, or any other contact or contactless printing or deposition technique.

15. The particles according to claim 1, wherein the polar organic solvent is selected from the group consisting of dimethyl sulfoxide, dimethylformamide, methanol, ethanol, acetonitrile and mixtures thereof.

* * * * *